United States Patent [19]

Yie et al.

[11] 4,291,727
[45] Sep. 29, 1981

[54] PIPELINE FLOW RESTRICTOR AND PROCESS

[75] Inventors: Gene G. Yie, Chicago; Thomas M. Bevan, Homewood, both of Ill.

[73] Assignee: Institute of Gas Technology, Chicago, Ill.

[21] Appl. No.: 16,025

[22] Filed: Feb. 28, 1979

[51] Int. Cl.³ .................... F16L 55/12; B23B 45/12
[52] U.S. Cl. ...................................... 138/93; 138/94; 137/318; 408/121; 408/123
[58] Field of Search ............ 138/89, 93, 94; 137/15, 137/317, 318; 408/121, 122, 123

[56] References Cited

U.S. PATENT DOCUMENTS

| | | | |
|---|---|---|---|
| 2,268,089 | 12/1941 | Wilson | 408/121 X |
| 2,843,154 | 7/1958 | Hosking | 138/93 |
| 2,966,814 | 1/1961 | Mueller et al. | 137/318 |
| 3,164,964 | 1/1965 | Josephson | 138/93 X |
| 3,460,553 | 8/1969 | Leopold et al. | 137/318 X |
| 3,498,333 | 3/1970 | Jones | 138/93 |
| 3,726,319 | 4/1973 | Patterson | 138/93 X |
| 3,842,864 | 10/1974 | Riegel et al. | 138/94 X |
| 3,870,085 | 3/1975 | Schneider | 138/93 |
| 4,063,844 | 12/1977 | Pessia | 137/318 X |
| 4,144,908 | 3/1979 | Dunn | 138/93 |
| 4,149,820 | 4/1979 | Newlin | 408/123 X |

FOREIGN PATENT DOCUMENTS 14942 of 1895 United Kingdom ................. 138/93

Primary Examiner—James E. Bryant, III
Attorney, Agent, or Firm—Thomas W. Speckman

[57] ABSTRACT

An apparatus and process for restricting fluid flow in a pipeline by inflation of an expandable flexible sleeve which is attached to a plug having a through hole for the inflation fluid. Several embodiments of flow restrictor cartridges are disclosed including cartridges having retainer arms which pivot outwardly against the interior wall of the pipeline restricting the axial expansion of the flexible sleeve upon inflation, thereby providing higher pressurization of the flexible sleeve for use in pipelines of pressures up to about 100 psi. The flow restrictor cartridges may be used in combination with an insertion assembly and by placement of a boring tip on the flow restrictor cartridge may be used with a disclosed cartridge insertion tool providing reduced loss of pipeline contents upon boring a hole in the pipeline followed by insertion and inflation of the flexible sleeve for restricting fluid flow in the pipe.

9 Claims, 14 Drawing Figures

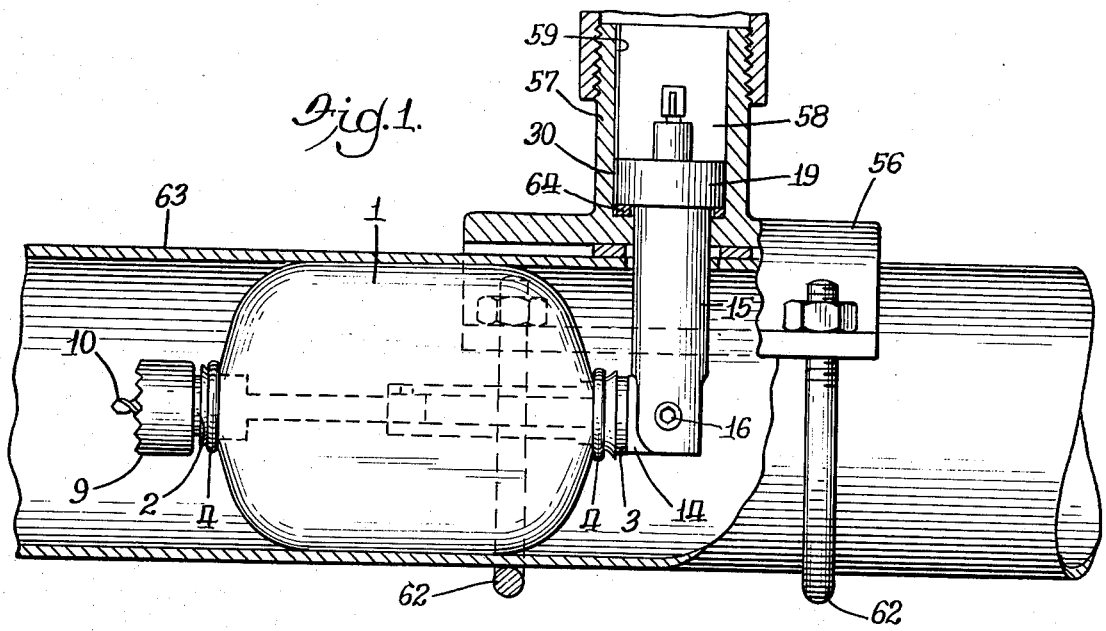
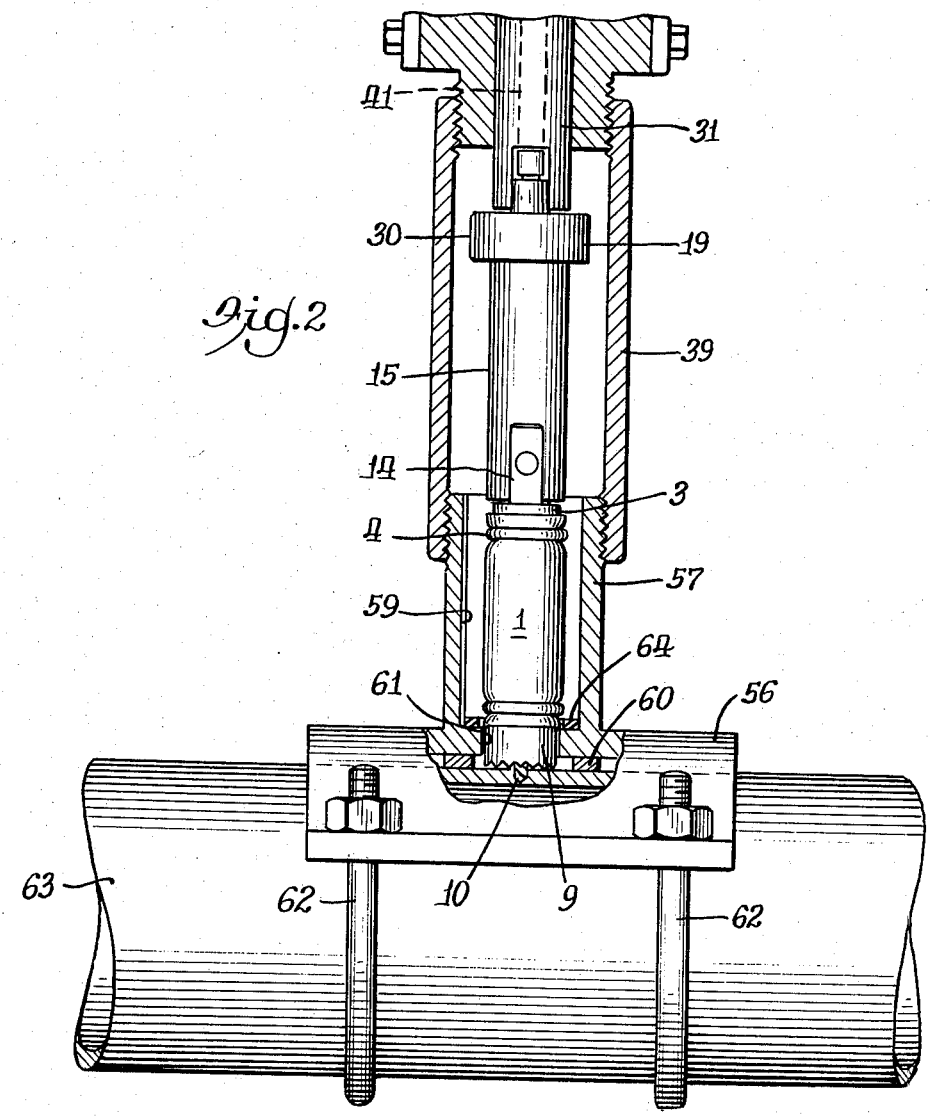

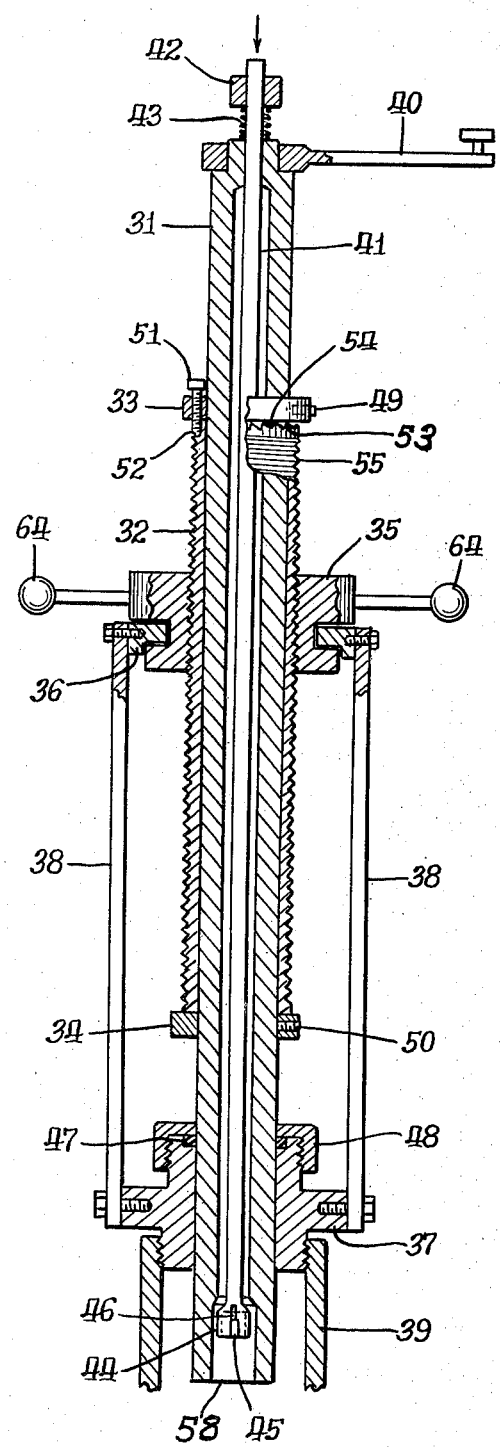
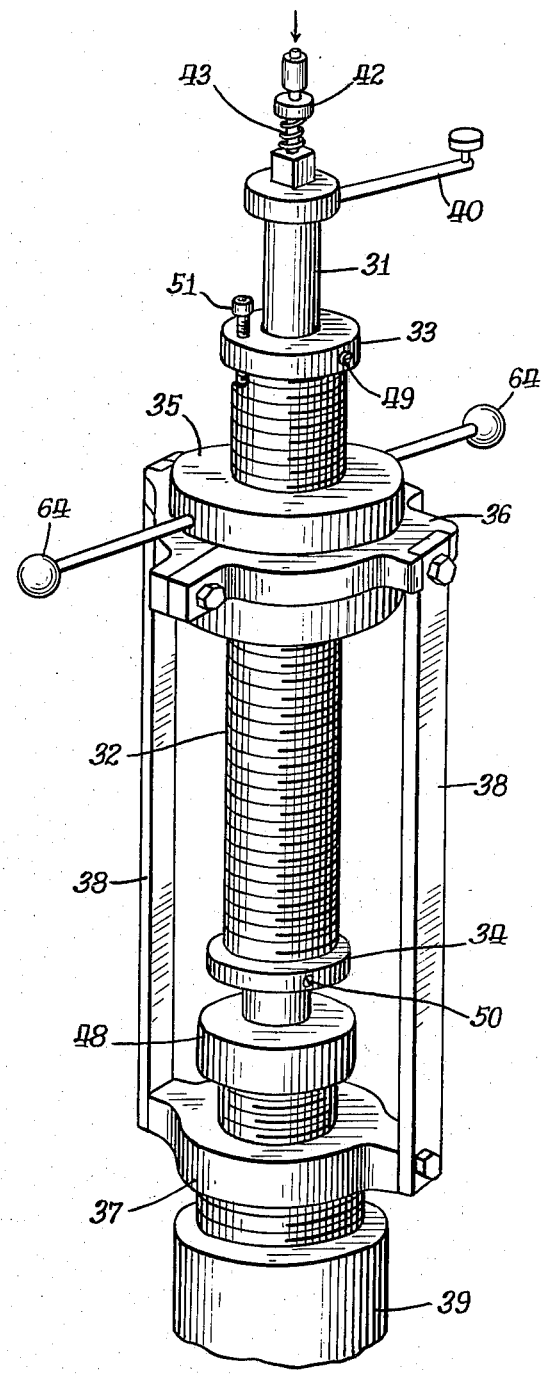

PIPELINE FLOW RESTRICTOR AND PROCESS

This invention relates to an apparatus and process for restricting fluid flow in a pipe. More particularly, this invention relates to an apparatus and process for rapidly controlling fluid flow in a pipeline in cases of leaks or the necessity for repairs or maintenance. The apparatus and process of this invention relates particularly to an improved sleeve for insertion into a pipeline where it is inflated thereby restricting flow of fluid within the pipeline and an improved method of its insertion into the pipeline.

Flow control valves are frequently available along a pipeline and closing of the valves for isolation of a damaged section of a pipeline will reduce the loss of fluid. However, such valves in most pipelines are spaced far apart, frequently many miles apart, rendering effective restriction of the pipeline under emergency conditions impractical through use of such valves. Even when flow control valves are closed and a ruptured section of a pipeline isolated, the static pressure within the pipeline will cause the fluid to flow out of the rupture resulting in loss of a large amount of fluid. Thus, it is highly desirable that the flow of fluid inside the pipeline be stopped or restricted across a short distance at the point of damage or rupture. Frequently the maintenance of a pipeline requires temporary restriction of fluid flow within the pipeline. If flow control valves are not present at desired locations, pinching of the pipeline with mechanical or hydraulic tools to halt the flow has been practiced. However, such operation will weaken the pipe or require the pinched section to be replaced subsequent to the other maintenance. The installation of temporary valves near the rupture site or the maintenance site is practiced. In both gas and water distribution systems, there is a need to have an easy and ready device and method to halt the flow of fluid within a short distance of a break or maintenance point.

A wide variety of devices and methods have been used to stop fluid flow in pipelines. One group of methods that has been used for stopping low pressure flow involves the direct injection of material such as viscous grease and expandable foams. Such methods are applicable only to pipelines operating at pressures in the order of 1 psi and less and has the serious disadvantage of removal of the injected material to reopen the pipeline. Another method currently used by the gas distribution industry, involves the insertion of a rubber bag and subsequent inflation of the bag with compressed gas to effect a seal inside the pipe. Such rubber bags may be spherical in shape such as the "Gardner-Goodman Stopper" as sold by Safety Gas Main Stopper Co., Inc., Brooklyn, New York, or they may be cylindrical shaped such as the "Goodman Cylindrical Stopper" as sold by Safety Gas Main Stopper Co., Inc. However, the inflatable bags are useful under low pipeline pressures, generally under 5 to 10 psi and considerably less with large diameter pipes. Attempts have been made to increase operability of inflatable stopping devices under higher pressures by utilization in conjunction with insertion of a device having multiple blades which mechanically open to cover the entire cross-sectional area of the pipeline which, when used in conjunction with inflated bags, uprates the pressure at which the stopping device may be used, as compared with the inflatable bag alone. Such devices are more fully described in the article, "An Improved Flow-Stopping System for Distribution Main" by A. R. Caruthers and D. R. Casson, I.G.E. Journal, pp. 183–192, June, 1973.

It is an object of this invention to provide an expandable cartridge apparatus and process for restricting pipeline flow which overcomes many of the disadvantages of the prior art devices.

It is another object of this invention to provide an apparatus and process for restricting pipeline fluid flow providing easy insertion and withdrawal of the expandable cartridge with reduced leakage of the pipeline fluid.

It is still another object of this invention to provide an expandable cartridge apparatus and process for restricting pipeline flow at pressures of up to about 75 to 100 psi.

It is yet another object of this invention to provide an apparatus for rapid flow shutdown of a pipeline which provides integral means of cutting a hole through the pipe wall to gain access to the interior of the pipeline with reduced fluid leakage.

It is still another object of this invention to provide a rapid flow shutdown apparatus and process which is operable with gas or liquid fluids and with pipelines of varying materials of construction.

These and other objects and advantages of this invention will become apparent from the following description taken in conjunction with the accompanying drawings showing preferred embodiments wherein:

FIG. 1 is a partially sectioned view of an inflated flow restrictor cartridge of one embodiment of this invention in place in a pipeline;

FIG. 2 is a partially sectioned view of one embodiment of the lower end of a cartridge insertion tool of one embodiment of this invention within a saddle attached to a pipe;

FIG. 3 is a partially sectioned view of one embodiment of a cartridge insertion tool of this invention;

FIG. 4 is a perspective view of the cartridge insertion tool shown in FIG. 3;

Referring to FIGS. 6–12, various embodiments of flow restrictor cartridges of this invention are shown. The flow restrictor cartridges have a rigid rear end plug which is fastened to a cartridge elbow and a flexible sleeve fastened to the rear end plug. The flexible sleeve is inflatable by passing pressurized gas or liquid through the rear end plug into the interior of the flexible sleeve inflating it to completely fill the diameter of the pipe thereby restricting fluid flow in the pipe.

Figure 6:
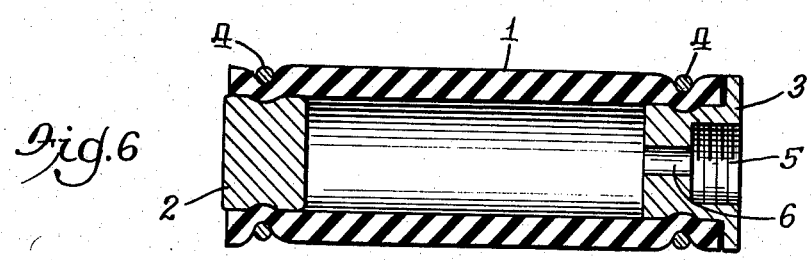
FIGS. 6–12 are sectional views of various embodiments of flow restrictor cartridges according to this invention.

FIG. 6 shows a flow restrictor cartridge of simple construction which is formed by plugging the ends of a suitable length of cylindrical expandable flexible sleeve 1 of suitable thickness and properties with a front end plug 2 and a rear end plug 3. The expandable flexible sleeve 1 is attached to the two end plugs by means of compression rings 4, or other suitable devices that permit expansion of the flexible sleeve to obtain a fluid-tight seal within a pipe. Rear end plug 3 has threaded receiving cylinder 5 and flow passage 6 in the central portion. While the front and rear end plugs are referred to as "substantially circular", the term is meant to include any smooth periphery, such as circular or elliptical to provide substantially fluid-tight attachment of the flexible sleeve.

Figure 7:
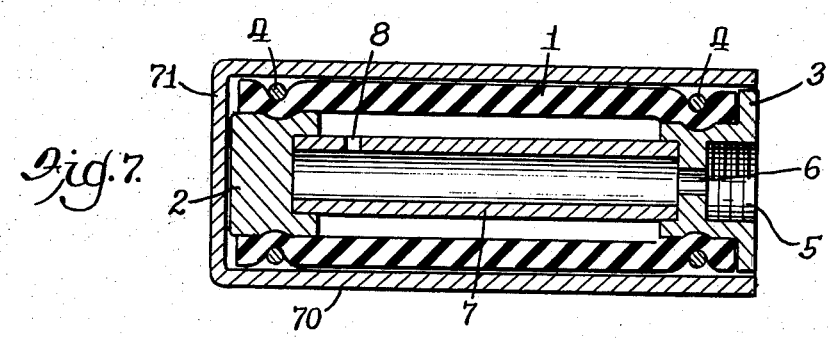

FIG. 7 shows a flow restrictor cartridge having hollow central cylinder 7 connecting front end plug 2 with rear end plug 3 to provide greater rigidity. Central cylinder 7 may or may not be rigidly attached to front end plug 2, depending on whether extension of the cartridge upon inflation is desired. If central cylinder 7 is rigidly attached to front end plug 2 and rear end plug 3, bleed hole 8 is necessary to provide passage of fluid for inflation of the flexible sleeve. Flexible protective sleeve cylinder 70 is shown in protective position over the flexible sleeve and may have end cap 71 or be open at both ends. Protective sleeve 70 need not be gas tight and is easily replaceable if damaged, providing abrasion protection from the pipe wall to expandable flexible sleeve 1. The protective sleeve may be used in conjunction with any of the flow restrictor cartridges of this invention.

Figure 8:
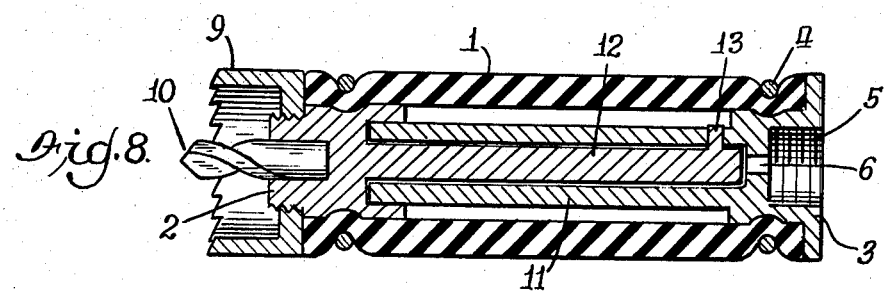

FIG. 8 illustrates a flow restrictor cartridge having hole cutter 9 and drill bit 10 attached to front end plug 2. Front end plug shaft 12 fits within torque transmitting cylinder 11. Shaft 12 has engaging pin 13 which engages torque transmitting cylinder 11 while permitting lengthwise sliding of shaft 12 within cylinder 11 when the flexible sleeve is extended upon inflation.

Figure 9:
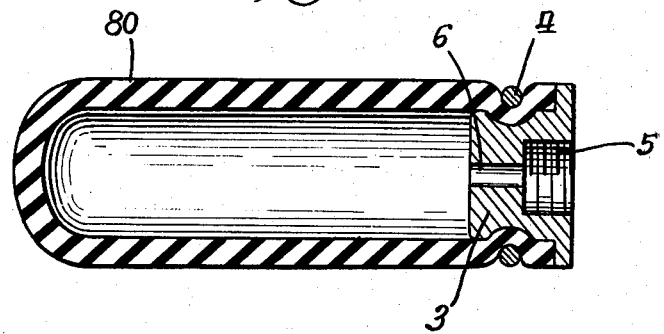

FIG. 9 shows another embodiment of a flow restrictor cartridge of this invention utilizing closed end flexible sleeve 80 attached to rear end plug 3.

Figure 10:
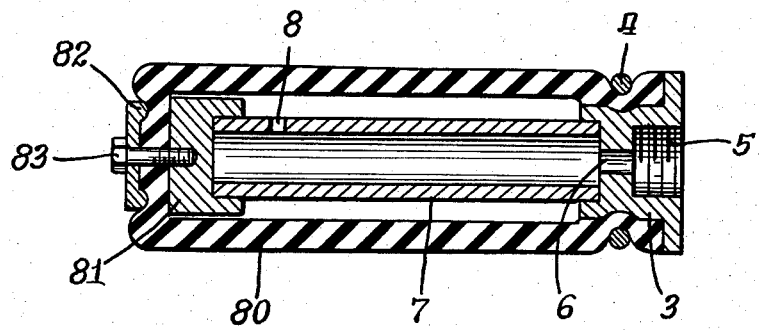

FIG. 10 shows use of closed end flexible sleeve 80 in combination with front end plug 81 and washer 82 attached by screw 83. The attachment of flexible sleeve 82 to front end plug 81 may also be made with a compression ring as more completely disclosed above, or any other suitable means.

Figure 11:
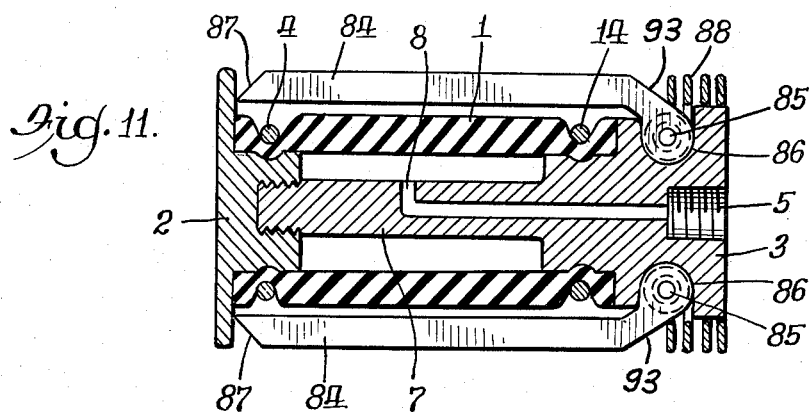

FIG. 11 shows a flow restrictor cartridge suitable for use in pipelines having higher gas pressures than those in which the above described flow restrictor cartridges may be used. Sleeve retainer arm 84 has pivot portion 85 at one end and angular surface 87 at the other end. Retainer arm pivot 85 is maintained in rotatable fashion within socket 86 in rear end plug 83. Spring 88 acts upon wedge surface 93 to hold sleeve retainer arm 84 in the position shown in FIG. 11. Upon inflation of flexible sleeve 1, the pressure of sleeve 1 moves sleeve retainer arm 84 outwardly by rotation of pivot portion 85 in socket 86.

Figure 12:
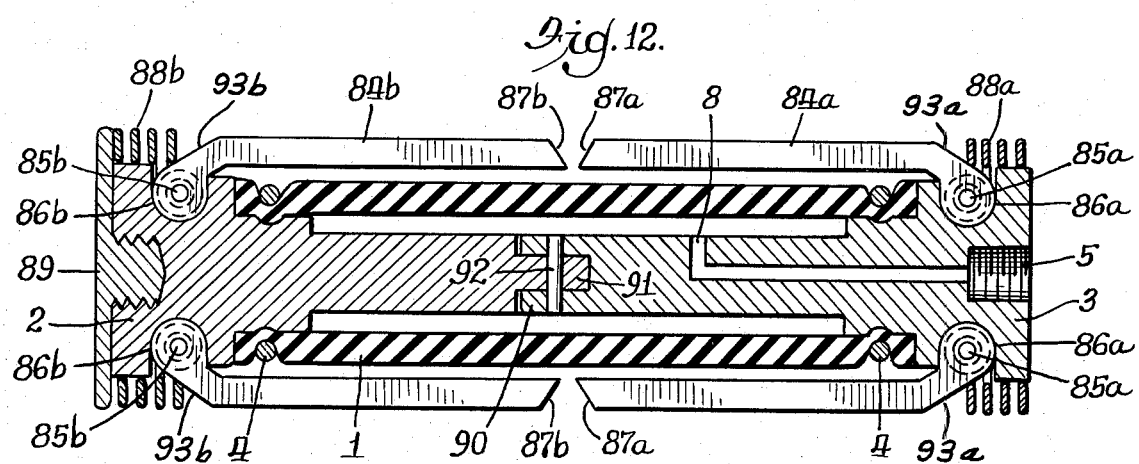

FIG. 12 shows an embodiment of a flow restrictor cartridge having sleeve retainer arms extending from each end of the cartridge. The numerals in FIG. 12 have the same meaning as previous figures, the duplicated parts relating to the dual set of sleeve retainer arms having suffixes "a" at the rear end and "b" at the front end. Spring 88b is retained by spring retainer 89 and spring 88a is retained by cartridge elbow 14. FIG. 12 also shows a cartridge which is bendable in the central portion to permit use of a cartridge longer than the pipe diameter. A spring loaded bending action, the same as provided between cartridge elbow 14 and cartridge adapter 15, is provided by parallel sided rear portion 91 of front end plug 2 fitting within rear end plug saddle 90 for rotation about pivot pin 92. A spring similar to 17, not shown in FIG. 12, provides force to maintain front end plug and rear end plug in line.

Any elastomer material including natural and synthetic rubbers may be used for flexible sleeve 1 as long as it provides sufficient elongation and residual strength under elongation to allow a relatively small cartridge to be inserted into a relatively large pipe without significantly weakening the strength of the pipe. Exemplary of suitable materials are natural latex rubber, butyl rubber, neoprene and nitrile rubber. Preferred pure latex rubber, containing no filler, provides a tensile strength of 3000-5000 psi; elongation to break of 500-900%; modulus at 100% elongation of 50-120 psi; Shore A Durometer hardness of 30-50; and specific gravity of about 0.95. The other parts of the flow restrictor cartridge may be fabricated from any metallic or plastic materials providing desired strength and corrosion resistance properties.

A pipeline fluid flow restrictor cartridge of this invention comprises a rear end plug, a cylindrical expandable flexible sleeve having an opening in the central portion of one end attached in substantially gas-tight relation to the rear end plug, the rear end plug having a through flow passage having one end in communication with the interior portion of the flexible sleeve and the other end adapted for communication with supply means for inflating the flexible sleeve, and the side of the rear end plug exterior to the flexible sleeve having attachment means for engagement with mating attachment means of an insertion or positioning assembly.

Figure 5:
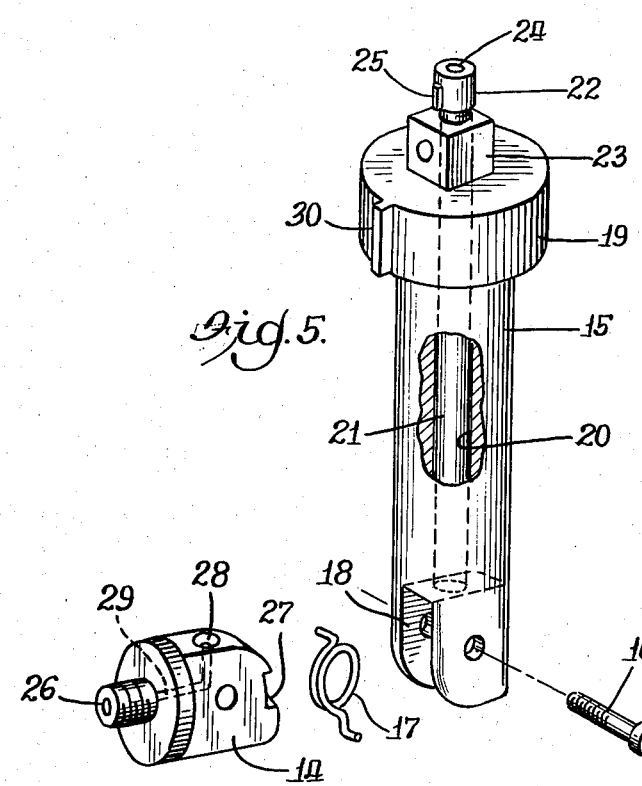
FIG. 5 is an expanded perspective view of bendable elbow portion of the cartridge insertion tool for positioning the flow restrictor cartridge of this invention.
Figure 14:
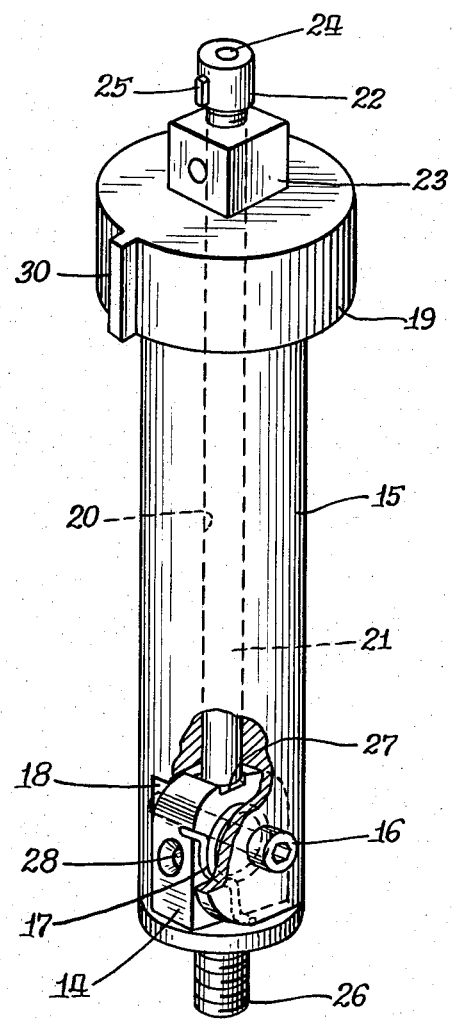
FIG. 14 is a partially sectioned perspective view of the cartridge insertion assembly shown in FIGS. 1 and 5 showing the mechanism for holding the insertion assembly components in straight relation as shown in FIG. 2.

FIG. 5 shows a perspective expanded view of a bendable-elbow assembly for positioning the flow restrictor cartridge inside a pipe. Cartridge elbow 14 joins adapter 15 by means of pivot screw 16 and is maintained in position at right angles to cartridge adapter 15 by spring 17 coacting with cartridge elbow 14 and cartridge adapter 15. Cartridge elbow 14 may be held in position with its long axis parallel to that of cartridge adapter 15 by the end of central passage tube 21 extending into notch 27 as shown in FIG. 14. Cartridge elbow 14 fits within slot 18 at the end of cartridge adapter 15 in a rotatable manner so that it may have its long axis parallel with or at right angles in a single direction to the long axis of cartridge adapter 15. Cartridge adapter 15 has central passage 20 passing from one end of the adapter to the other. Central passage tube 21 passes through central passage 20. Adapter head 19 has ratchet head 23 extending outwardly from its end for engagement with a mating drive means. Ratchet head 23 is shown in FIG. 5 as being square, but may be any polygonal shape adapted to fit a driving means. Central passage tube 21 continues through the central portion of ratchet head 23 to the exterior. Adapter head 19 has an indicator to show the direction of cartridge elbow 14 when it is in a perpendicular position extending in a single direction from cartridge adapter 15. In FIG. 5, indicator ridge 30 serves this purpose, but of course, may be any suitable indicator means. Check valve 22 is in communication at its inward end with central passage tube 21 and has valve stem 24 for opening the valve upon depressing it allowing fluid flow into and through central passage tube 21. Check valve 22 is shown with engagement pin 25 allowing engagement of a valve engaging head in substantially air-tight relation and permitting rotation of central passage tube 21 in a manner so that it may be unscrewed outwardly from ratchet head 23 thereby removing the opposite end from notch 27. When the end of central passage tube 21 is removed from notch 27, the force of spring 17 moves cartridge elbow 14 into a position at a right angle to its former position. Check valve 22 may be generally similar in construction to the valves commonly used in vehicle tires. Cartridge elbow 14 has threaded cylinder 26 extending from its forward end for engagement with threaded receiving cylinder 5 in rear end plug 3 of a flow restrictor cartridge. Mating area 28 provides substantially gas-tight connection between the end of central passage tube 21 and passage 29 which extends from mating area 28 to the exterior of the end of threaded cylinder 26. The end of central passage tube 21 may be brought into substantially gas-tight relationship with mating area 28 by screwing the tube inwardly with the threads in ratchet head 23. Thus, fluid introduced through check valve 22 to central passage tube 21 passes through passage 29 to the interior of a flow restrictor cartridge.

The restrictor cartridge may be assembled in combination with an insertion assembly comprising a cartridge elbow and a cartridge adapter cylinder. The cartridge elbow has a mating attachment means at one end for mating with the rear plug attachment means and pivot means at the other end. The cartridge adapter cylinder has pivot means at one end and a flanged adapter head at the other end. The pivot means of the cartridge elbow and the pivot means of the cartridge adapter cylinder engage to provide pivot, by spring means, of the cartridge elbow from a position having its axis parallel to that of the cartridge adapter cylinder to a position extending perpendicular to the axis of the cartridge adapter. A tube extending through the central portion of the cartridge adapter cylinder is in communication, when the cartridge elbow and adapter cylinder are perpendicular, with a passage through the cartridge elbow which is in communication at its other end with the rear plug through flow passage for inflation of the flexible sleeve.

FIGS. 3 and 4 show a cartridge-insertion hand tool for use in conjunction with the fluid flow restrictor and process of this invention. This tool can be used for cutting circular holes through a pipe wall by attachment of a hole cutter directly to the end of the tool itself or for both cutting a hole and inserting a flow restrictor cartridge of this invention into a pipeline by attachment of a restrictor cartridge having a hole cutter attached to the cartridge. Hollow boring rod 31 extends in rotatable relationship through threaded cylinder 32, boring rod holder 37 and into adapter cylinder 39. Threaded cylinder 32 is held in place around boring rod 31 by upper collar 33 and lower collar 34. Adjustment collar 35 rotates in threaded relation around threaded cylinder 32, threadedly engaged with reverse threads 55 which extend for substantially the length of threaded cylinder 32. Outer adjustment collar 36 surrounds adjustment collar 35 and engages adjustment collar 35 in rotational and fixed vertical manner as best seen in FIG. 3 by outer adjustment collar 36 being rotatable within the groove of adjustment collar 35. Outer adjustment collar 36 is maintained in fixed relationship with boring rod holder collar 37 by connecting bars 38. Adjustment collar 35 has handles 64 for rotatable adjustment. The end of boring rod 31 extending outwardly from threaded cylinder 32 has handle 40 which may be a detachable handle as shown or any other suitable means for providing rotational forces to boring rod 31. Feed tube 41 extends through the central portion of boring rod 31. Feed tube 41 has rotation knob 42 at its upper end to enable rotation and spring 43 coacting between the top of boring rod 31 and rotation knob 42 to maintain feed tube 41 in upward position inside boring rod 31. At the opposite end, feed tube 41 has valve engaging head 44 for engagement with check valve 22 of cartridge adapter 15. Engaging slot 45 in valve engaging head 44 engages engagement pin 25 of check valve 22 to provide means for rotation of central passage tube 21. Valve engaging head 44 also has engaging stem 46 in its central portion for depressing valve stem 24 of check valve 22 to open the valve. Feed tube 41 is maintained within boring rod 31 by valve engaging head 44 fitting snugly within the opening of the end of boring rod 31, while maintaining freedom for rotation of feed tube 41 within boring rod 31. The lower end of boring rod 31 is provided with ratchet head engagement socket 58 adapted for engagement with ratchet head 23 of the bendable elbow assembly. Boring rod holder collar 37 has outer threads on flanges extending both ways along boring rod 31 from the central portion. The upper end of boring rod holder collar 37 is provided with O-ring seal 47 and end cap 48 to maintain O-ring seal 47 in place around boring rod 31 to provide a gas-tight seal. The lower end of boring rod holder collar 37 is threadedly attached to adapter cylinder 39 which is a cylinder having both ends threaded for attachment of the cartridge insertion tool to a pipe saddle.

FIG. 2 shows a pipe saddle suitable for use with the apparatus and process of this invention. Pipe saddle 56 has cylinder 57 extending therefrom for threadable engagement with the threads in the lower end of adapter cylinder 39. Pipe saddle 56 has circular opening 61 sized to permit passage of hole cutters and flow restrictor cartridges as used in this invention. Gasket 60 is placed around opening 61 between pipe saddle 56 and pipe 63 to provide a substantially gas-tight seal between pipe 63 and the chambers formed by cylinder 57 and adapter cylinder 39. U-bolts 62 secure pipe saddle 56 to pipe 63. Pipe saddle 56 is sized so that the curvature of the pipe saddle will fit the curvature of the pipe wall and differences in such curvature may be accommodated by gasket 60 which may also be of suitable thickness to assure the center line of the flow restrictor cartridge being along the center line of pipe 63.

The flow restrictor cartridges are sized slightly shorter than the inside diameter of the pipe upon which they are to be used or have a flexible joint as shown in FIG. 12 providing for longer cartridges. The cartridges have a diameter in the order of 25% of the inside diameter of the pipe upon which they are to be used. Adapter cylinder 39 has a length such that the bottom of adapter head 19 seats upon gasket 64 at the bottom of cylinder 57 when the center line of the flow restrictor cartridge, when at right angles to cartridge adapter 15, is along the center line of pipe 63. Thus, adapter cylinder 39 may be provided in different lengths to accommodate different length flow restrictor cartridges.

Operation of the pipeline fluid flow restrictor according to one embodiment of this invention is best seen by reference to FIGS. 1-3. Pipe saddle 56 is attached to pipe 63 with U bolts 62 upstream from the location in which fluid flow is to be restricted. A flow restrictor cartridge, of the type shown in FIG. 8 having drill bit 10 and hole cutter 9 affixed to front end plug 2 is attached to cartridge elbow 14 and maintained in line with cartridge adapter 15 by central passage tube being in engagement with notch 27 as described above. Cartridge adapter 15 is engaged at its upper end with the lower end of boring rod 31 of the cartridge insertion tool. Adapter cylinder 39 is attached to cylinder 57 and the boring rod assembly with the attached cartridge is attached by fastening boring rod holder collar 37 to the upper end of adapter cylinder 39. Boring rod 31, engaged with ratchet head 23 of adapter head 19, is then lowered by rotating adjustment collar 35 in a clockwise direction until drill bit 10 contacts the pipe wall.

To bore a hole through the wall of pipe 63, locking bolt 51 in upper collar 33 is raised to disengage threaded cylinder 32 from boring rod 31. Movement of ratchet handle 40 in a clockwise direction commences cutting of the desired hole. Whenever increased force between the drill bit or hole cutter and pipe wall is desired, rotation of ratchet handle 40 in the counterclockwise direction causes spring loaded catch 54 in engagement with a notch 53 to turn threaded cylinder 32 counterclockwise. Counter clockwise reverse threaded 55 movement in adjustment collar 35 causes boring rod 31 to be lowered, increasing the contact force of hole cutter 9 against the pipe wall. Resuming clockwise rotation of ratchet arm 40 will continue the hole boring and the process is repeated until the hole is cut through the pipe wall. Drill bit 10 will retain the cutout portion of the pipe wall, preventing any possible interference with the flow restriction. Locking bolt 51 is then pressed down to engage locking slot 52 in the upper end of threaded cylinder 32 and boring rod 31 can be lowered by rotation of adjustment collar 35 lowering the flow restrictor cartridge into the pipe. Adapter head 19 will contact the upper portion of cylinder 57 and further lowering of boring rod 31 can be achieved only by indicator 30 on adapter head 19 engaging slot 59 of cylinder 57. This can be achieved by rotating ratchet handle 40 to locate the fit or an external marking can be made on boring rod 31 to indicate the correct orientation of the flow restrictor cartridge. Engagement of indicator 30 with engaging slot 59 assures positioning of the flow restrictor cartridge pointing upstream along the center line of the pipe.

When indicator 30 engages slot 59 the boring rod may be further lowered until the tip of drill bit 10 touches the bottom of pipe 63. Then, feed tube 41 is lowered so that valve engaging head 44 engages check valve 22 with engaging slot 45 engaging engagement pin 25. Then, rotating tube 41 in the counterclockwise direction causes tube 21 to move upward and to become disengaged from notch 27 of cartridge elbow 14. Spring 17 wil cause cartridge elbow 14 to rotate to a position perpendicular to cartridge adapter 15 resulting in the flow restrictor cartridge being parallel to the center line of the pipe. Boring rod 31 is further lowered until the bottom of adapter head 19 is firmly seated against gasket 64 in a position which will provide a substantially gas-tight seal around the cartridge adapter and place the center line of the flow restrictor cartridge substantially along the center line of pipe 63. The flow restrictor cartridge is then ready for use.

To inflate flexible sleeve 1 of the flow restrictor cartridge, feed tube 41 is lowered to engage check valve 22 and rotated clockwise thereby rotating central passage tube 21 in cartridge adapter 15 causing engagement with mating area 28 of cartridge elbow 14 to form a seal. The cartridge adapter aids in keeping the cartridge in a rigid position inside the pipe. Then feed tube 41 is pressed down hard causing stem 46 to engage valve stem 24 opening check valve 22 so that compressed gas such as nitrogen or air or pressurized liquid such as water, depending upon the nature of the fluid in the pipe, is introduced into flexible sleeve 1 causing it to inflate. The compressed gas or pressurized liquid is supplied to a desired pressure which is dependent upon the fluid pressure inside the pipe and the strength of the flexible sleeve 1. Pressurized liquid is preferred for higher pressures and results in less long term leakage than compressed gas. Inflated flexible sleeve 1 will exert forces normal to the pipe wall sufficient to seal the pipe and cause restriction or complete stoppage of flow of fluid inside the pipe. Both friction between the pipe wall and flexible sleeve 1 and the rigid connection of the flexible sleeve to cartridge adapter 15 which is seated within the hole through the pipe and the hole through the pipe saddle will prevent movement of the inflated flexible sleeve by the fluid pressure within the pipe. When flexible sleeve 1 is inflated to the desired pressure, the pressure applied to feed tube 41 can be released and spring 43 will cause valve engaging head 44 to be disengaged from check valve 22, thus closing check valve 22. The boring rod assembly can then be removed from the pipe saddle by removing adapter cylinder 39 and a cap can be screwed onto the top of cylinder 57 to enclose and seal the area of the hole through which the flow restrictor cartridge extends. The insertion tool can be used at another location.

Figure 13:
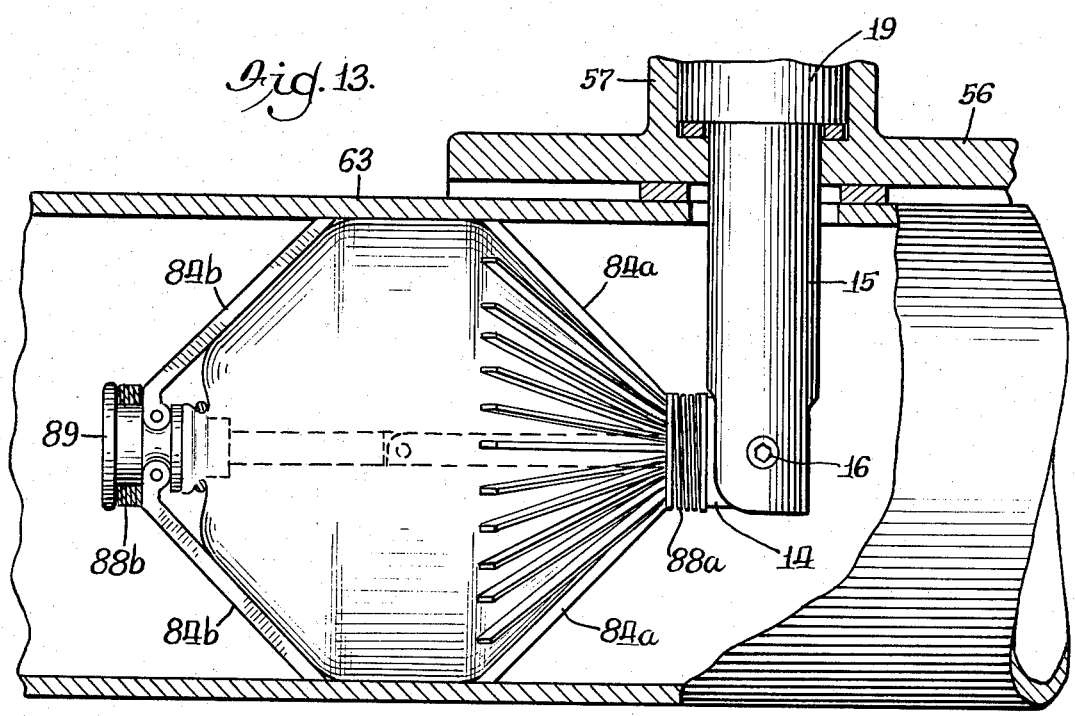
FIG. 13 is a partially sectioned view of the flow restrictor cartridge of FIG. 12 in place in a pipeline.

When higher pipeline pressures are encountered, a flow restrictor cartridge of the type shown in FIG. 11 or 12 may be used to provide stoppage of pipeline fluid flow at pipeline pressures of up to 75 to 100 psig. These cartridges, having sleeve retainer arms, are inserted into the pipeline in the same manner as described above. When the direction of flow of fluid within the pipeline is known, a flow restrictor cartridge having sleeve retainer arms extending from the rear end plug, as shown in FIG. 11, may be used. In this case the pipeline pressure will exert force on the upstream end of the inflated flexible sleeve while the sleeve retainer arms will exert force on the other end to restrict axial expansion and permit greater pressure within the inflated sleeve, thereby providing greater force to the pipeline wall and affording pipeline fluid flow restriction at higher pipeline pressures. When the direction of flow of fluid within the pipeline is not known, a flow restrictor cartridge having sleeve retainer arms extending from both the rear and the front end plugs, as shown in FIG. 12, may be used. The effect of the sleeve retainer arms in use is best seen in FIG. 13. The angle of end 87 of sleeve retainer arm 84 provides firm engagement with the interior of pipe 63. As best seen in FIG. 13, when flexible sleeve 1 is inflated, sleeve retainer arms 84 rotate outwardly in socket 86 until they engge the interior surface of the pipe wall restricting the axial expansion of flexible sleeve 1. A sufficient number of sleeve retainer arms 84 are provided to restrain at least one end portion of flexible sleeve 1, thereby allowing a greater pressure to be applied to fluid within the flexible sleeve. The number of sleeve retainer arms is dependent upon the pipeline diameter and the width of each arm which should be sufficiently wide to restrain the flexible sleeve and to prevent creating ballooning areas causing weakness in the flexible sleeve. This provides greater resistance to movement within the pipeline and closure at higher pressures. It is preferred that the sleeve retainer arms be at an angle of about 40° to 60° from the center line of the cartridge when the sleeve is inflated.

When the need for fluid flow restriction is over and flow of fluid inside the pipeline desired, flexible sleeve 1 may be readily deflated by depressing valve stem 24 of check valve 22. In cases where cartridges having sleeve retainer arms are used, when sleeve 1 is delfated, action of spring 88 causes the sleeve retainer arms to return to their retracted position as shown in FIGS. 11 and 12. The bendable elbow assembly and flow restrictor cartridge may be removed by pulling them out of the pipe through cylinder 57. Cylinder 57 may then be capped and the pipe put back into full service. The hole in the pipe wall may be temporarily plugged by a compression plug having a bolt threaded into a washer on the interior of the wall, a latex rubber sleeve, loose washer on the outside of the wall under the bolt head. The assembly is inserted into the hole and bolt tightened on the threaded interior washer causing the sleeve to be squeezed and fill the hole.

When high strength steel pipe is involved, the above method is not entirely satisfactory since too high a torque is necessary in the hole boring. In such case, a gate valve or a flapper valve is installed in cylinder 57 or adapter cylinder 39 allowing drilling with conventional hole cutters through the valve and shutting of the valve during attachment of the insertion assembly and cartridges of this invention. These methods reduce leakage which is particularly important on plastic gas pipelines due to potential fire hazard caused by presence of static electricity.

We have found that to obtain a gas-tight seal with a flow restrictor cartridge of this invention, without sleeve retainer arms, in polyvinylchloride pipe, a flexible latex rubber sleeve must be inflated to a pressure in the order of 1.3 times the pressure of the fluid in the pipe. This is significantly reduced with pipes having a rough interior surface.

The following Examples show specific embodiments of our invention and are intended to be exemplary and not to limit our invention in any way.

EXAMPLE I

A flow restrictor cartridge as shown in FIG. 7 was constructed 3.75 inches long and 1.25 inches in diameter. The flexible sleeve was a section of rubber tubing of pure latex rubber having a wall thickness of 0.25 inch. The ends of the rubber sleeve were attached to two steel end plugs by means of wire wrapping compression rings. The flow restrictor cartridge was introduced with an insertion assembly as shown in FIG. 1, into a 4 inch polyvinylchloride pipe and inflated with compressed air to a pressure of 40 psi. In the inflated condition the flow restrictor cartridge withstood air pressure inside the pipe up to 30 psi without leakage or movement of the inflated cartridge.

Another cartridge was constructed with $\frac{3}{8}$ inch thick latex rubber flexible sleeve and inflated with compressed air to 70 psi which withstood air pressure inside the pipe up to 50 psi without leakage or movement of the inflated cartridge.

EXAMPLE II

A cartridge insertion tool as shown in FIGS. 3 and 4 was constructed with a boring rod of stainless steel 20 inches long, 1¼ inch O.D. and $\frac{3}{8}$ inch I.D. The boring rod had a $\frac{5}{8}$ inch square ratchet head at the upper end and a $\frac{5}{8}$ inch square hole at the lower end. The threaded cylinder was made of Bronze alloy 12 inches long, 0.25 inch thick, 1 1/16 inch I.D. and having eight reversed threads per inch. The feed tube was ¼ inch stainless steel tubing 20 inches long having a $\frac{3}{4}$ inch diameter knob at the upper end and a ½ inch diameter valve engaging head at the lower end. A toggle valve was installed at the upper end of the feed tube for controlling the introduction of compressed gas. The valve engaging head had a ¼ inch long slot in its wall for engaging the check valve and a valve actuating stem insert with a rubber gasket in its interior. A ½ inch long spring was situated between the top of the boring rod and the knob at the top of the feed tube controlling the position of the valve engaging tube head inside the boring rod so that when the spring was not compressed there was about 1 inch clearance between the end of the valve engaging head and the end of the boring rod.

The adjustment collar was made of carbon steel 3½ inches in diameter, 1½ inches thick and had a ½ inch wide groove around its periphery to accommodate the outer adjustment collar. Two ¼ inch diameter steel rods 3 inches in length were installed on opposite sides of the adjustment collar to serve as handles for rotation. The outer adjustment collar was made of carbon steel and formed by molding together two half circle discs and had a central opening of 2½ inches in diameter. The connecting bars were made of ¼ inch thick steel $\frac{5}{8}$ inch wide and 11½ inches long, bolted at one end to opposite sides of the outer adjustment collar and at the other end to the boring rod holder collar. Boring rod holder collar had a central bore of 1 1/16 inch in diameter and a groove around the central bore of the upper end to fit a 1¼ inch rubber O-ring. The adapter cylinder was made of a 3 inch steel cylinder about 8 inches in length having internal threads on both ends. The threaded cylinder was maintained in desired location around the boring rod by a steel ring locked collar at each end with a central bore slightly larger than 1¼ inch and fastened to the boring rod by set screws. The upper locked collar had a spring loaded catch on its lower side to engage saw tooth upper edge of the threaded cylinder and a locking bolt which engages a slot in the upper portion of the threaded cylinder. The insertion tool provided a total vertical travel of about 10 inches and can accommodate hole cutters and cartridges up to about 2 inches in diameter.

The insertion tool has been found satisfactory in cutting holes in plastic and mild steel pipe and insertion of flow restrictor cartridges of this invention. The boring rod assembly of this invention is lighter, more compact and easier to use than comparable tools known to the inventors.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A flow restrictor cartridge for insertion through a hole in a pipeline side wall in combination with an insertion assembly wherein said flow restrictor cartridge comprises a substantially circular rear end plug, a cylindrical expandable flexible sleeve having an opening in the central portion of one end attached in substantially fluid-tight relation to the periphery of said rear end plug, said rear end plug having a through flow passage having one end in communication with the interior portion of said flexible sleeve and the other end adapted for communication with supply means providing fluid for inflating said flexible sleeve, the side of said rear end plug exterior to said flexible sleeve having attachment means for engagement with mating attachment means of said insertion assembly, said flow restrictor cartridge having a deflated length less than the inside diameter of the pipe in which it is to be used; and said insertion assembly comprising a cartridge elbow and a cartridge adapter cylinder; said cartridge elbow having a mating attachment means at one end mated with said cartridge rear end plug attachment means and a pivot means at the other end; said cartridge adapter cylinder having pivot receiving means at one end and a flanged adapter head at the other end, the pivot means of the cartridge elbow and the pivot receiving means of the cartridge adapter cylinder engaging; a spring means engaged with said pivot means and said pivot receiving means to provide rotation of the cartridge elbow from a position having its axis parallel to that of the cartridge adapter cylinder to a position extending perpendicular to the axis of the cartridge adapter; and a tube extending through the central portion of the cartridge adapter cylinder in communication, when the cartridge elbow and adapter cylinder are perpendicular, with a passage through the cartridge elbow in communication with said rear plug through flow passage.

2. The combination flow restrictor cartridge and insertion assembly of claim 1 wherein said cartridge elbow has a notch at the end of said pivot means located so that said tube extending through said adapter cylinder extends into said notch to hold said cartridge elbow and said adapter cylinder in a parallel relation to each other.

3. The pipeline flow restrictor cartridge for insertion through a hole in a pipeline side wall and insertion assembly combination assembly of claim 1 in combination with a cartridge insertion tool comprising: a hollow boring rod having handle means for rotation at one end and engagement means engaging said adapter cylinder head; an exterior reverse threaded cylinder in rotatable relation surrounding said boring rod for a substantial portion of its length and held in place by a lower collar and an upper collar fixed to said boring rod, said upper collar having engagement means engaging said threaded cylinder for counterclockwise rotation with said boring rod and releasing said threaded cylinder for clockwise rotation of said boring rod; an adjustment collar threadedly engaged with said threaded cylinder and handle means for rotation of said adjustment collar; and connecting bar means maintaining said adjustment collar in rotatable relation to said threaded cylinder and in fixed relation to said pipeline side wall.

4. A pipeline fluid flow restrictor cartridge for insertion through a hole in the pipeline side wall in combination with an insertion assembly, said cartridge comprising; a substantially circular rear end plug, a substantially circular front end plug, a cylindrical radially expandable flexible sleeve having an opening in the central portion of one end and attached in substantially fluid-tight relation to the periphery of said rear end plug at said one end and said front end plug at the opposite end, said rear end plug having a through flow passage having one end in communication with the interior portion of said flexible sleeve and the other end adapted for communication with supply means providing fluid for inflating said flexible sleeve, the side of said rear end plug exterior to said flexible sleeve having attachment means for engagement with mating attachment means of said insertion assembly, said flow restrictor cartridge having a deflated length less than the inside diameter of the pipeline in which it is to be used; and said insertion assembly comprising; a cartridge elbow and a cartridge adapter cylinder; said cartridge elbow having a mating attachment means at one end mated with said cartridge rear end plug attachment means and a pivot means at the other end; said cartridge adapter cylinder having pivot receiving means at one end and a flanged adapter head at the other end, the pivot means of the cartridge elbow and the pivot receiving means of the cartridge adapter cylinder engaging; a spring means engaged with said pivot means and said pivot receiving means to provide rotation of the cartridge elbow from a position having its axis parallel to that of the cartridge adapter cylinder to a position extending perpendicular to the axis of the cartridge adapter; and a tube extending through the central portion of the cartridge adapter cylinder in communication, when the cartridge elbow and adapter cylinder are perpendicular, with a passage through the cartridge elbow in communication with said rear plug through flow passage.

5. The pipeline flow restrictor cartridge for insertion through a hole in a pipeline side wall and insertion assembly combination assembly of claim 4 in combination with a cartridge insertion tool comprising: a hollow boring rod having handle means for rotation at one end and engagement means engaging said adapter cylinder head; an exterior reverse threaded cylinder in rotatable relation surrounding said boring rod for a substantial portion of its length and held in place by a lower collar and an upper collar fixed to said boring rod, said upper collar having engagement means engaging said threaded cylinder for counterclockwise rotation with said boring rod and releasing said threaded cylinder for clockwise rotation of said boring rod; an adjustment collar threadedly engaged with said threaded cylinder and handle means for rotation of said adjustment collar; and connecting bar means maintaining said adjustment collar in rotatable relation to said threaded cylinder and in fixed relation to said pipeline side wall.

6. The pipeline flow restrictor cartridge-insertion assembly-insertion tool combination of claim 5 having a feed tube extending through said hollow boring rod in communication with said tube extending through the central portion of the cartridge adapter cylinder for provision of pressurized fluid to inflate said flexible sleeve.

7. The combination flow restrictor cartridge and insertion assembly of claim 4 wherein said cartridge elbows has a notch at the end of said pivot means located so that said tube extending through said adapter cylinder extends into said notch to hold said cartridge elbow and said adapter cylinder in a parallel relation to each other.

8. A pipeline fluid flow restrictor cartridge for insertion through a hole in the pipeline side wall in combination with an insertion assembly, said cartridge comprising; a substantially circular rear end plug, a substantially circular front end plug, a cylindrical radially expandable flexible sleeve having an opening in the central portion of one end and attached in substantially fluid-tight relation to the periphery of said rear end plug at said one end and said front end plug at the opposite end, said rear end plug having a through flow passage having one end in communication with the interior portion of said flexible sleeve and the other end adapted for communication with supply means providing fluid for inflating said flexible sleeve, the side of said rear end plug exterior to said flexible sleeve having attachment means for engagement with mating attachment means of said insertion assembly, said front end plug having a mating member extending rearwardly and in engagement with a mating member extending forwardly from said rear end plug permitting lengthwise sliding of said mating members when said flexible sleeve is extended upon inflating, said flow restrictor cartridge having a deflated length less than the inside diameter of the pipeline in which it is to be used; and said insertion assembly comprising; a cartridge elbow and a cartridge adapter cylinder; said cartridge elbow having a mating attachment means at one end mated with said cartridge rear end plug attachment means and a pivot means at the other end; said cartridge adapter cylinder having pivot receiving means at one end and a flanged adapter head at the other end, the pivot means of the cartridge elbow and the pivot receiving means of the cartridge adapter cylinder engaging; a spring means engaged with said pivot means and said pivot receiving means to provide rotation of the cartridge elbow from a position having its axis parallel to that of the cartridge adapter cylinder to a position extending perpendicular to the axis of the cartridge adapter; and a tube extending through the central portion of the cartridge adapter cylinder in communication, when the cartridge elbow and adapter cylinder are perpendicular, with a passage through the cartridge elbow in communication with said rear plug through flow passage.

9. A boring tool for boring a hole in a pipe wall comprising: a hollow boring rod having handle means for rotation at one end and engagement means engaging a boring tool at the other end; an exterior reverse threaded cylinder in rotatable relation surrounding said boring rod for a substantial portion of its length and held in place by a lower collar and an upper collar fixed to said boring rod, said upper collar having engagement means engaging said threaded cylinder for counter-clockwise rotation with said boring rod and releasing said threaded cylinder for clockwise rotation of said boring rod; an adjustment collar threadedly engaged with said threaded cylinder and handle means for rotation of said adjustment collar; and connecting bar means maintaining said adjustment collar in rotatable relation to said threaded cylinder and in fixed relation to said pipe wall.

* * * * *